(12) United States Patent
Fudatate et al.

(10) Patent No.: US 6,501,764 B1
(45) Date of Patent: Dec. 31, 2002

(54) METHOD OF AND APPARATUS FOR REALIZING PRIORITY DATA TRANSMISSIONS FOR CSMA/CD SYSTEM

(75) Inventors: Satoshi Fudatate, Kawasaki (JP); Hiroshi Nagano, Kawasaki (JP); Minoru Yamaguchi, Kawasaki (JP); Hiroaki Hamano, Kawasaki (JP); Naohide Sekiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/195,048

(22) Filed: Nov. 18, 1998

(30) Foreign Application Priority Data

Mar. 11, 1998 (JP) .......................................... 10-059768

(51) Int. Cl.[7] .......................................... H04L 12/413
(52) U.S. Cl. ................... 370/445; 370/400; 370/448
(58) Field of Search .......................... 370/445, 465, 370/235, 447, 400, 448; 455/452; 709/225

(56) References Cited

U.S. PATENT DOCUMENTS

| | | | | |
|---|---|---|---|---|
| 4,661,902 A | * | 4/1987 | Hochsprung et al. | 364/200 |
| 5,752,193 A | * | 5/1998 | Scholefield et al. | 455/452 |
| 5,920,566 A | * | 7/1999 | Hendel et al. | 370/401 |
| 5,940,399 A | * | 8/1999 | Weizman | 370/445 |
| 5,960,001 A | * | 9/1999 | Shaffer et al. | 370/448 |
| 5,982,779 A | * | 11/1999 | Krishnakumar et al. | 370/447 |
| 6,002,669 A | * | 12/1999 | White | 370/235 |
| 6,141,355 A | * | 10/2000 | Palmer et al. | 370/465 |
| 6,161,138 A | * | 12/2000 | Gross et al. | 709/225 |
| 6,292,493 B1 | * | 9/2001 | Campbell et al. | 370/445 |

FOREIGN PATENT DOCUMENTS

| | | |
|---|---|---|
| JP | 59-139743 | 8/1984 |
| JP | 59-153352 | 9/1984 |
| JP | 63-95750 | 4/1988 |
| JP | 3-250937 | 11/1991 |
| JP | 5-22305 | 1/1993 |

* cited by examiner

Primary Examiner—Hassan Kizou
Assistant Examiner—Anti-Vu H Ly
(74) Attorney, Agent, or Firm—Katten, Muchin, Zavis, Rosenman

(57) ABSTRACT

A method of transmitting a large amount of data with priority for use with a CSMA/CD system includes the steps of checking to see if a transmission line has a free space in response to a data transmission request from a node serving as a source node, transmitting, if the transmission line has a free space, a priority transmission notice carried by a data-link-layer protocol signal of the CSMA/CD system from the source node to the other nodes, transmitting data for which the data transmission request has been made from the source node to a node serving as a destination node, and putting the nodes except the source node in a transmission-disabled, reception-enabled state when the priority transmission notice is received by the nodes. Also provided is an apparatus for achieving such a method.

11 Claims, 20 Drawing Sheets

DESTINATION ADDRESS: FILLED WITH 1s FOR BROADCASTING
SOURCE ADDRESS: ADDRESS OF DTEa

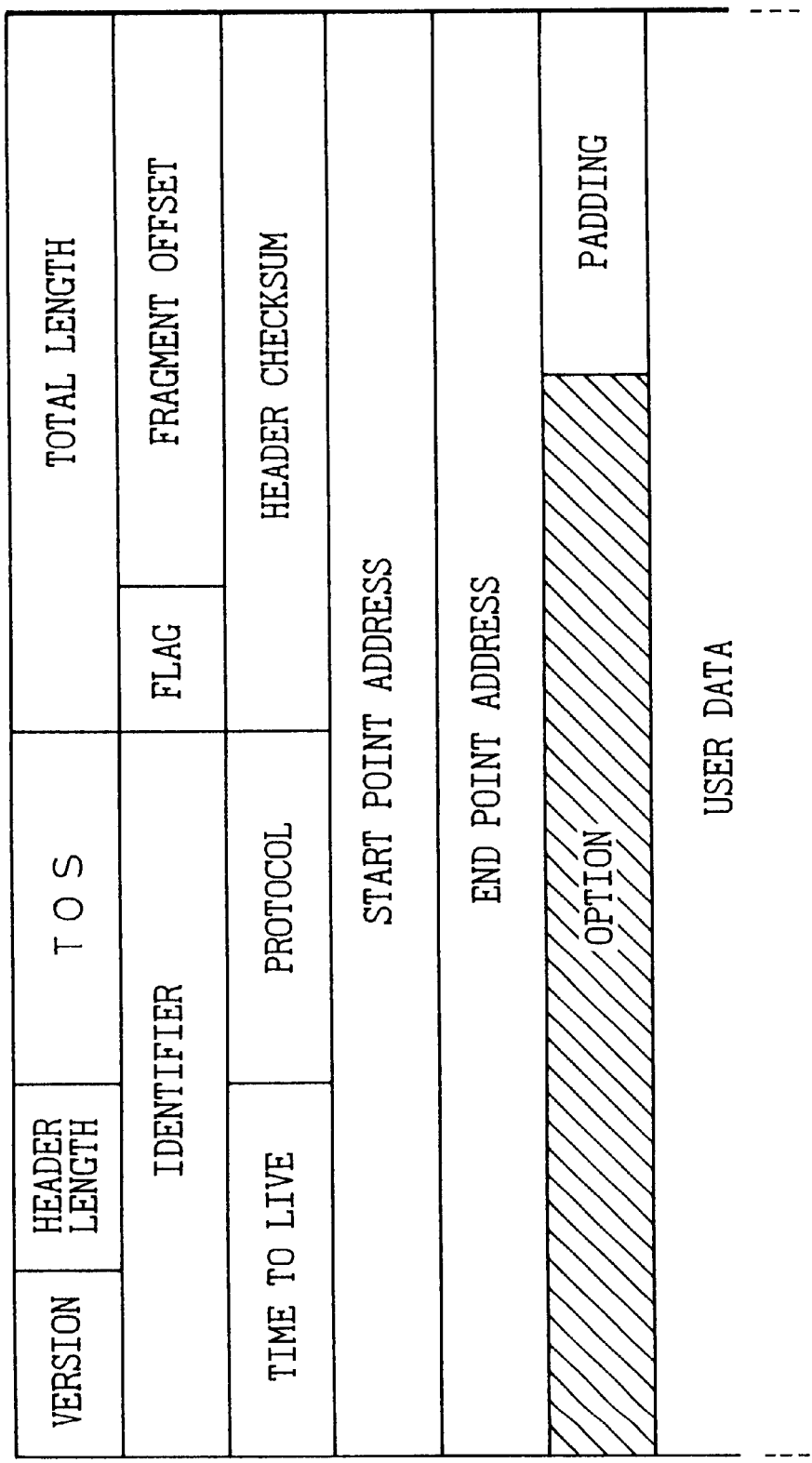

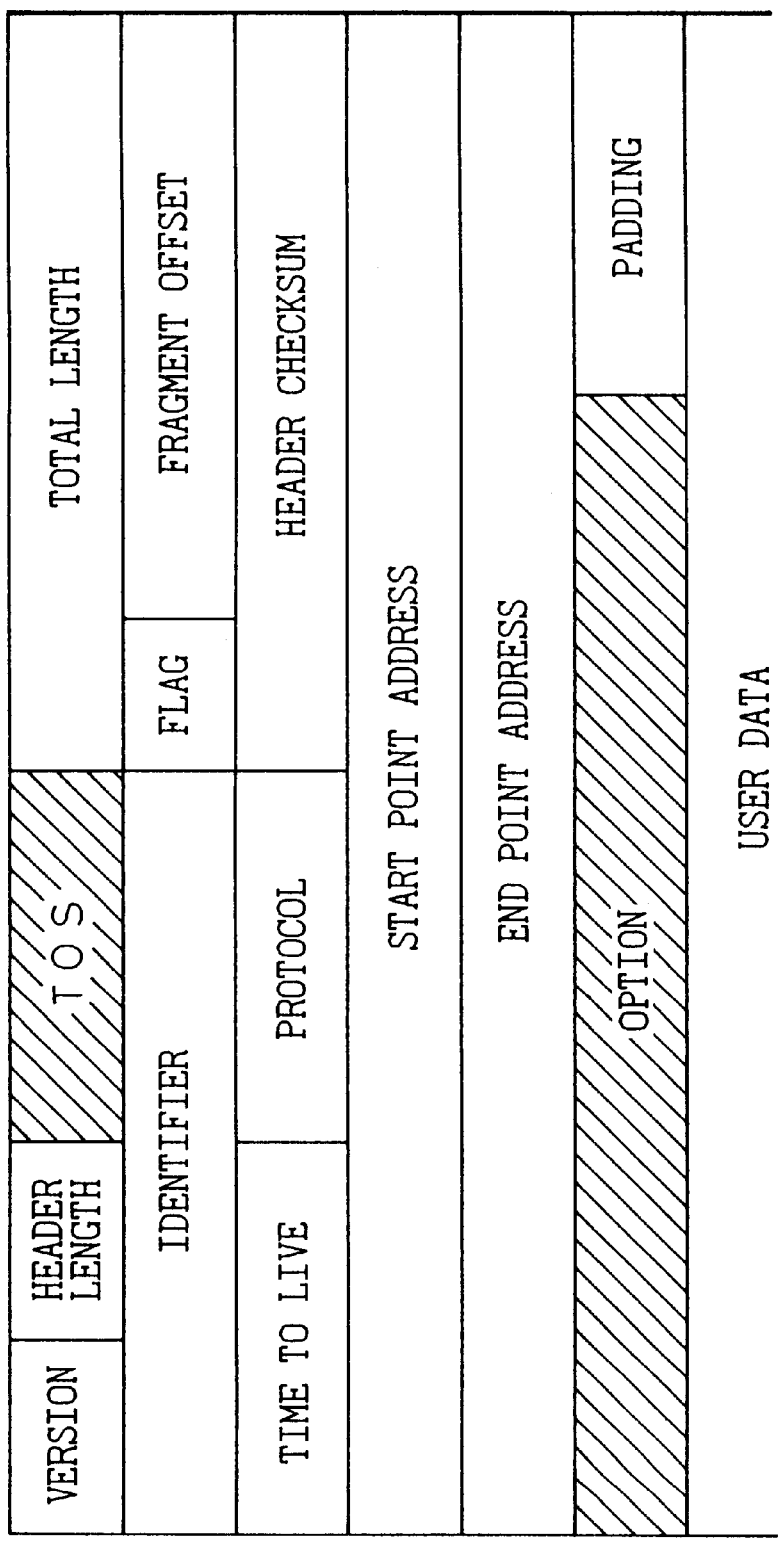

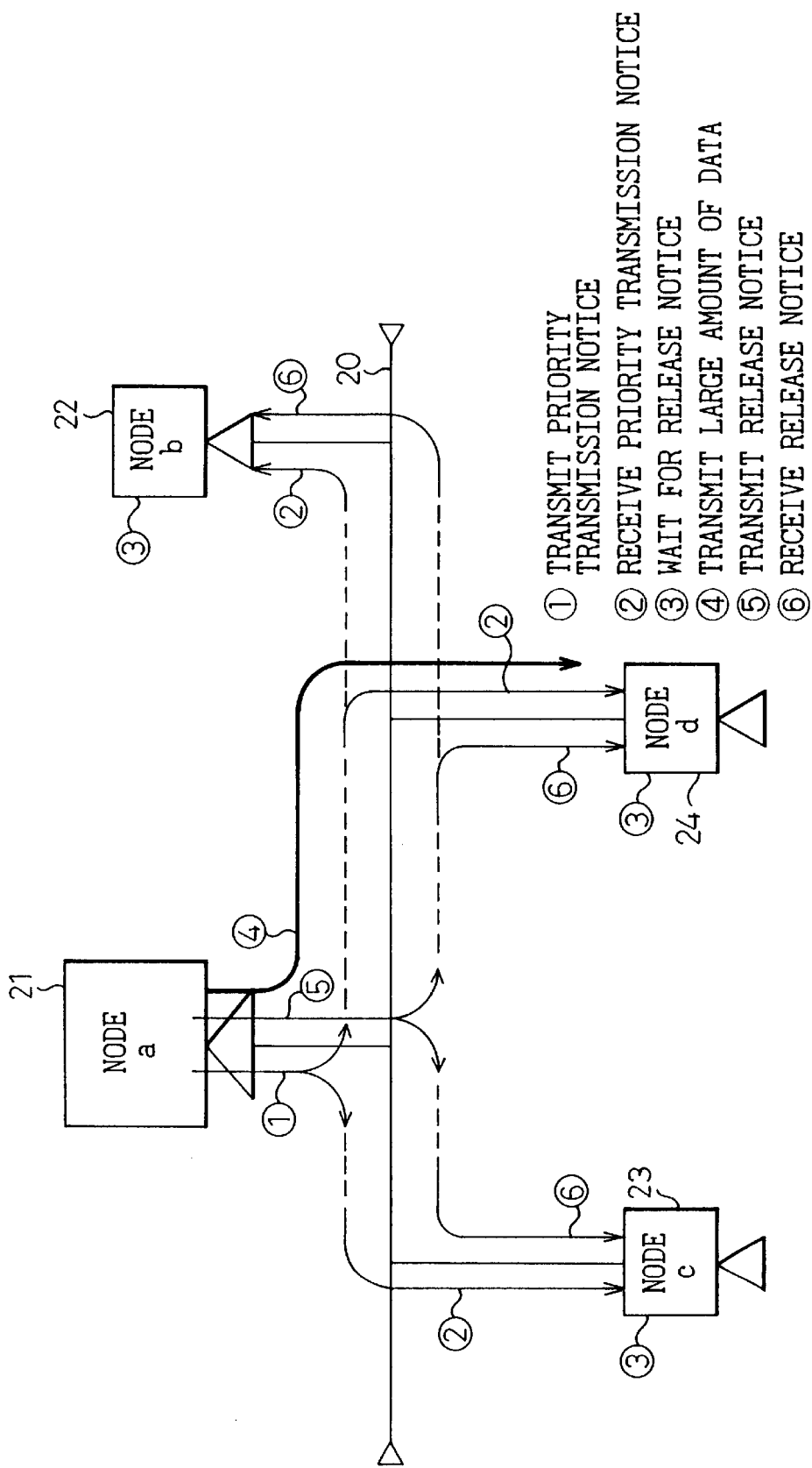

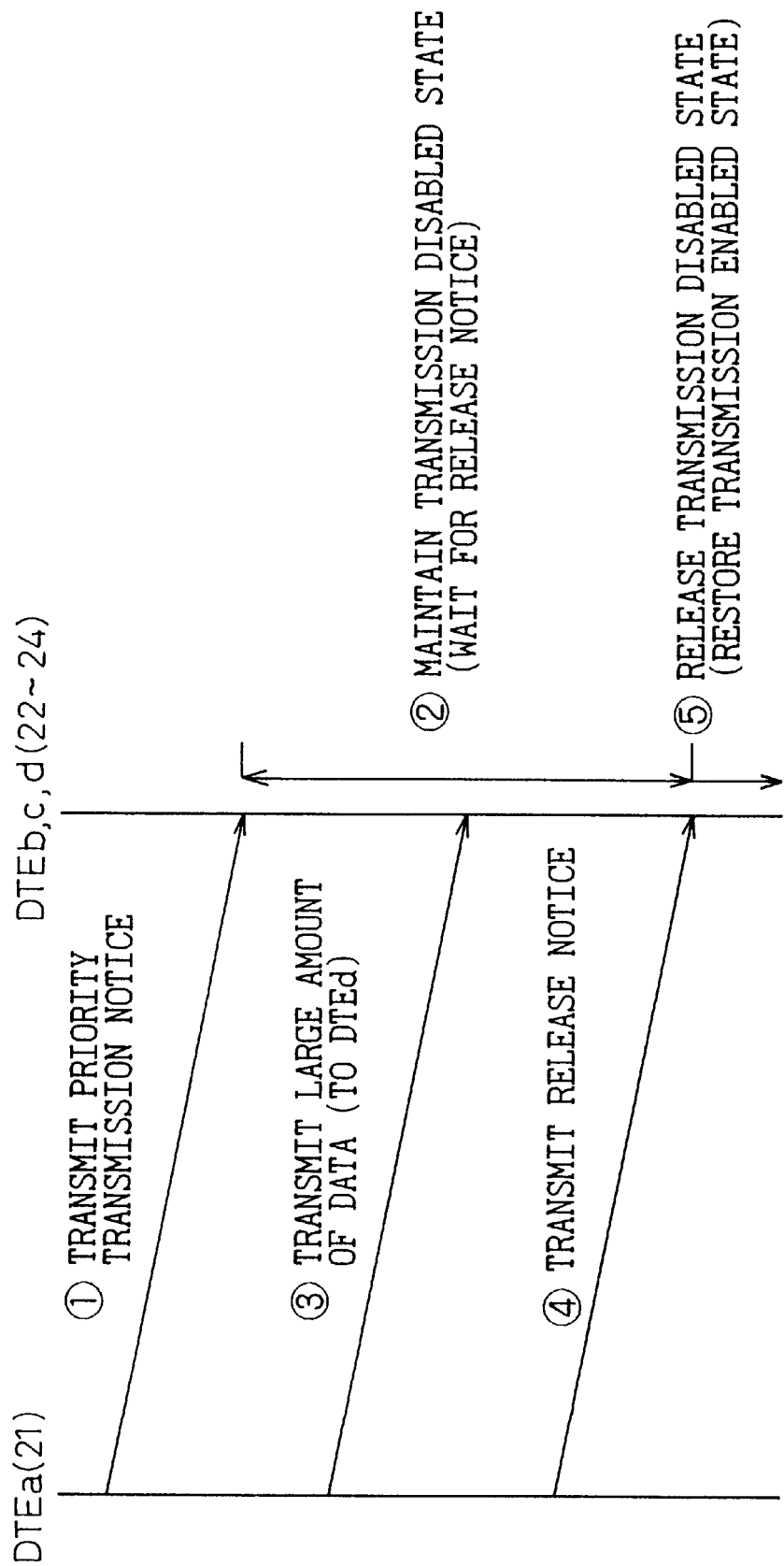

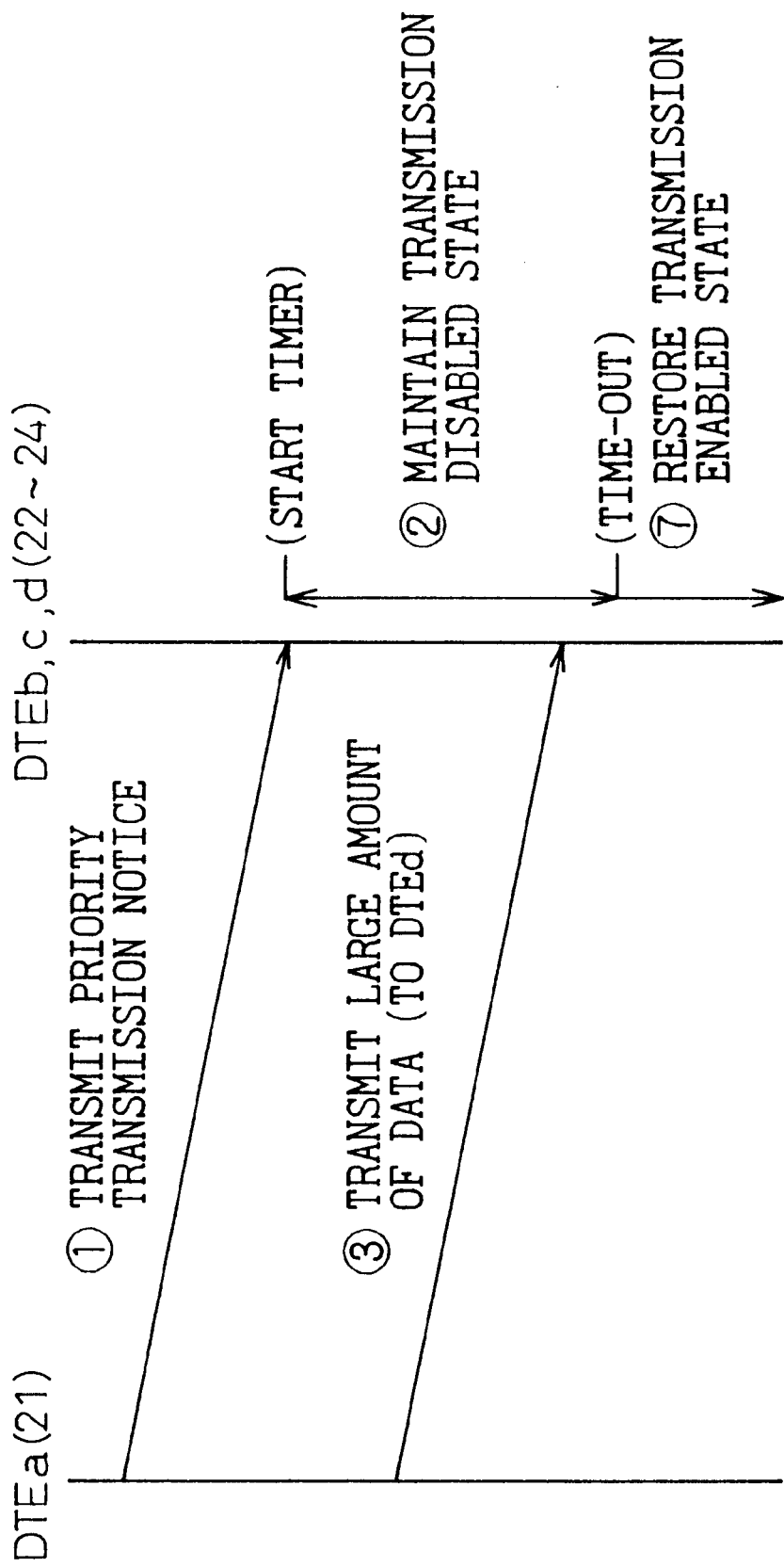

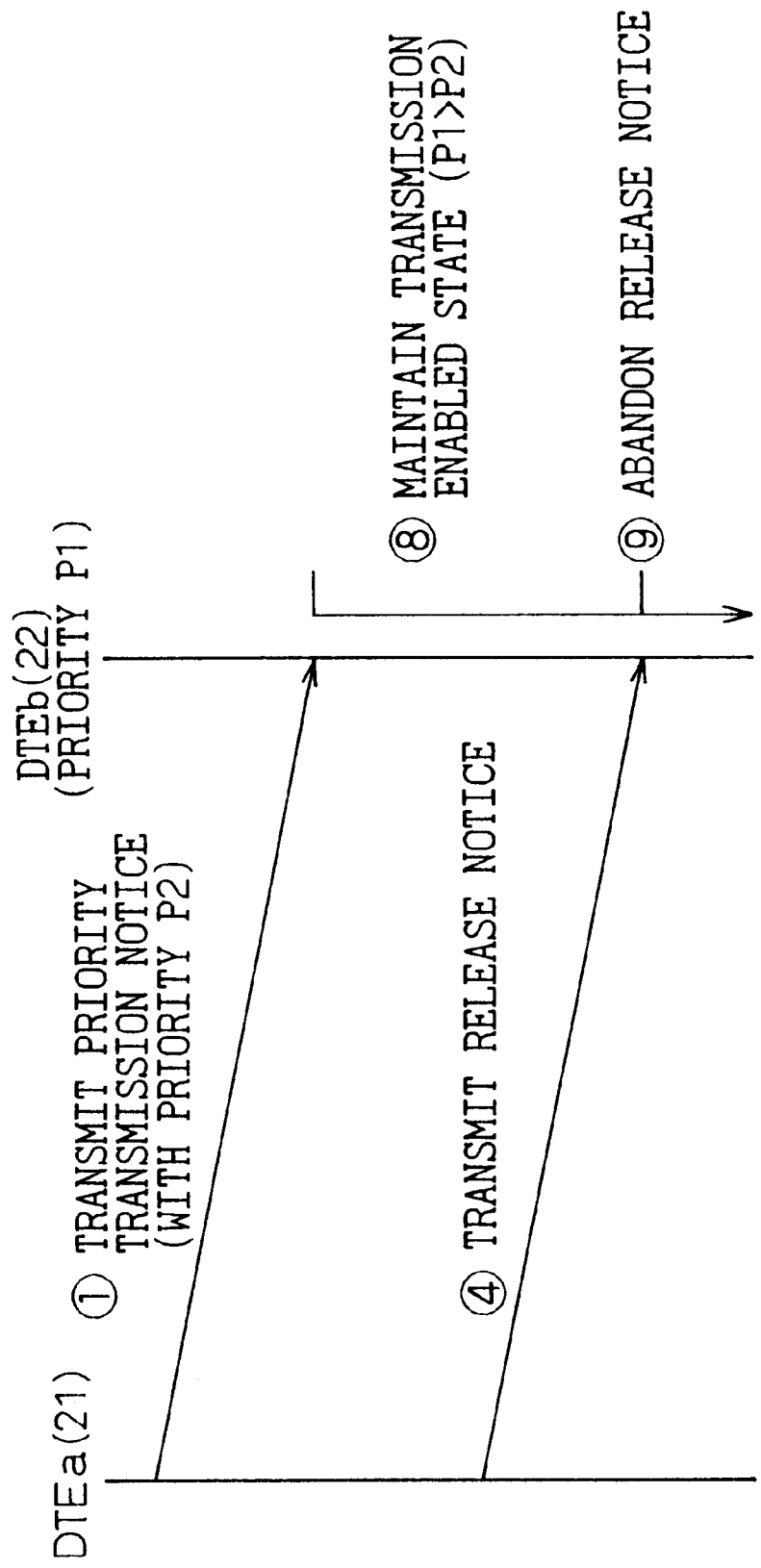

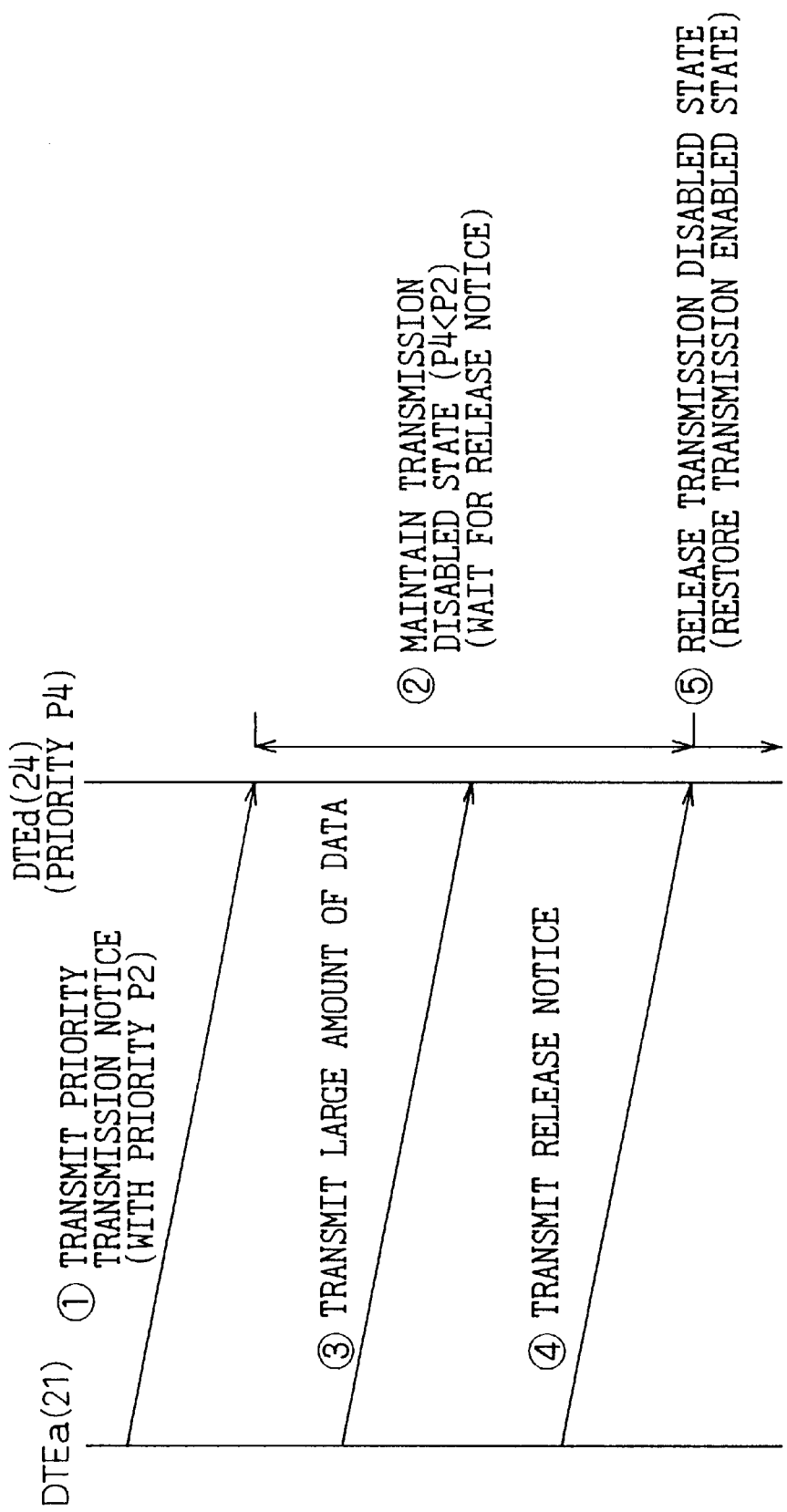

METHOD OF AND APPARATUS FOR REALIZING PRIORITY DATA TRANSMISSIONS FOR CSMA/CD SYSTEM

BACKGROUND OF THE INVENTION

1. Field of the Invention

The present invention relates to a LAN (local area network) employing a CSMA/CD (carrier sense multiple access with collision detection) system. In particular, the present invention relates to a method of, and an apparatus for, transmitting a large amount of data with priority in a LAN employing the CSMA/CD system.

2. Description of the Related Art

The CSMA/CD system has been developed as an access control system for Ethernet, which is a kind of a LAN, and has been standardized as IEEE (Institute of Electrical and Electronics Engineers) 802.3. The CSMA/CD system is widely used for bus-topology LANs and tree-topology LANs.

FIG. 1 shows relationships between IEEE 802.3 layers and OSI (open system interconnection) reference model layers.

IEEE 802.3 specifies a PLS (physical layer signaling) sublayer, an MAC (media access control) sublayer, and an LLC (logical link control) sublayer. The PLS sublayer corresponds to a physical layer of an OSI reference model, and the MAC and LLC sublayers correspond to a data link layer of the OSI reference model. The present invention relates to the data link layer and a network layer of the OSI reference model depicted with thick continuous lines in FIG. 1.

FIGS. 2 and 3 briefly explain the operation of the CSMA/CD system.

FIG. 2 shows collision detection by the CSMA/CD system, and FIG. 3 shows a resending operation by the CSMA/CD system after detecting a collision.

In FIG. 2, a transmission line 10 may be a twisted-pair cable or a coaxial cable. Nodes A to D (11 to 15) are connected to the line 10 and always monitor, in the PLS sublayer, a carrier detection signal that corresponds to a carrier signal transmitted through the line 10.

One of the nodes 11 to 15 transmits data if the node detects according to the carrier detection signal that none of the other nodes is using the-line 10. If any one of the nodes is using the line 10, the other nodes postpone transmitting data. A node starts to transmit data after a carrier detection signal disappears and after a minimum frame-to-frame spacing time (9.6 $\mu$s) elapses.

If the node 12 transmits data to the node 15, and at the same time, if the node 13 sends data to the node 14, a collision occurs. Then, a jam signal or an interference signal is sent for a predetermined time (3.2 to 4.8 $\mu$s) to all nodes (the nodes 11 to 15 in this example) connected to the same segment of the line 10 or contained in the same broadcast range to inform the nodes of the collision.

In FIG. 3, the nodes 12 and 13 that have caused the collision calculate respective back-off times according to a probability algorithm to avoid another collision. After the back-off times, the nodes 12 and 13 resend the data. In FIG. 3, the node 13 has a shorter back-off time, and therefore, succeeds to send the data to the node 14. At this time, the node 12 having a longer back-off time delays resending the data according to a carrier detection signal.

In this way, the CSMA/CD system gives the same priority to all nodes 11 to 15 connected to the line 10. Namely, the CSMA/CD system is unable to give priority to a specific node to access the line 10.

As the number of nodes connected to the line 10 increases, the traffic of the line 10 increases to rapidly increase the number of collisions. This deteriorates the transmission efficiency of the line 10 because many resending operations must be carried out as explained with reference to FIG. 3.

To solve this problem, Japanese Unexamined Patent Publication No. 05-300153 gives priority to a node and makes the node send a jam signal to forcibly stop communication between the other nodes. Thereafter, the node with priority starts transmitting data before the shortest back-off time elapses. To achieve the forcible stoppage of communication, this prior art uses the standard collision detecting and data resending functions in the PLS sublayer (corresponding to the physical layer of the OSI reference model).

SUMMARY OF THE INVENTION

An object of the present invention is to provide a method of, and an apparatus for, realizing priority data transmission for the CSMA/CD system. The present invention uses the data link or network layer of the OSI reference model depicted with thick continuous lines in FIG. 1. The present invention gives priority to a node to access a transmission line and makes the node send a frame or packet with a priority transmission notice through the data link or network layer to all nodes connected to the same segment of the transmission line to which the node in question is connected. Thereafter, the node in question temporarily exclusively uses the line to transmit a large amount of data in a short time without forcibly cutting communication between the other nodes.

In order to accomplish the object, the present invention provides a method of realizing priority data transmission for the CSMA/CD system, including the steps of checking to see if a transmission line has a free space in response to a data transmission request from a node serving as a source node, transmitting, if the transmission line has a free space, a priority transmission notice with a protocol signal from the source node to the other nodes in a data link layer of the CSMA/CD system, transmitting data for which the data transmission request has been made from the source node to a node serving as a destination node, and putting the nodes except the source node in a transmission-disabled, reception-enabled state when the priority transmission notice is received by the nodes.

The method may include the steps of transmitting a release notice from the source node, and restoring the transmission disabled nodes to a transmission-reception-enabled state when the release notice is received by the nodes or when a predetermined time elapses after the priority transmission notice is received by the nodes.

The method may include the steps of attaching a priority assigned to the source node to the priority transmission notice and transmitting the priority transmission notice from the source node to the other nodes, and comparing, at each of the nodes except the source node, the priority assigned to the source node with priority assigned to the node in question, and if the priority assigned to the source node is higher than that assigned to the node in question, putting the node in question in the transmission-disabled, reception-enabled state.

The protocol signal in the data link layer of the CSMA/CD system may be an MAC frame. The MAC frame has a frame type field and an LLC header field, one of the fields being used to carry the priority transmission notice with or without a value indicating the priority assigned to the source node, or the release notice.

Instead of the protocol signal in the data link layer of the CSMA/CD system, a protocol signal in a network layer of the OSI reference model may be used. The protocol signal in the network layer may be an IP datagram signal having an option field and a TOS field. The option field is used to carry any one of the priority transmission notice and the release notice. The TOS field is used to carry a value indicating the priority assigned to the source node.

BRIEF DESCRIPTION OF THE DRAWINGS

The present invention will be more clearly understood from the description as set forth below with reference to the accompanying drawings, in which:

FIGS. 6 and 7 show examples of IP datagram (packet) formats for realizing priority data transmission in a network layer of the OSI reference model;

FIG. 8 explains a basic operation of a method of realizing priority data transmission for the CSMA/CD system according to the present invention;

FIG. 9 shows an operation sequence of the method of FIG. 8;

FIG. 10 shows another operation sequence of the method of FIG. 8;

FIGS. 11 and 12 show operation sequences based on the operation sequence of FIG. 9 involving priority determination;

DESCRIPTION OF THE PREFERRED EMBODIMENTS

Figure 1:
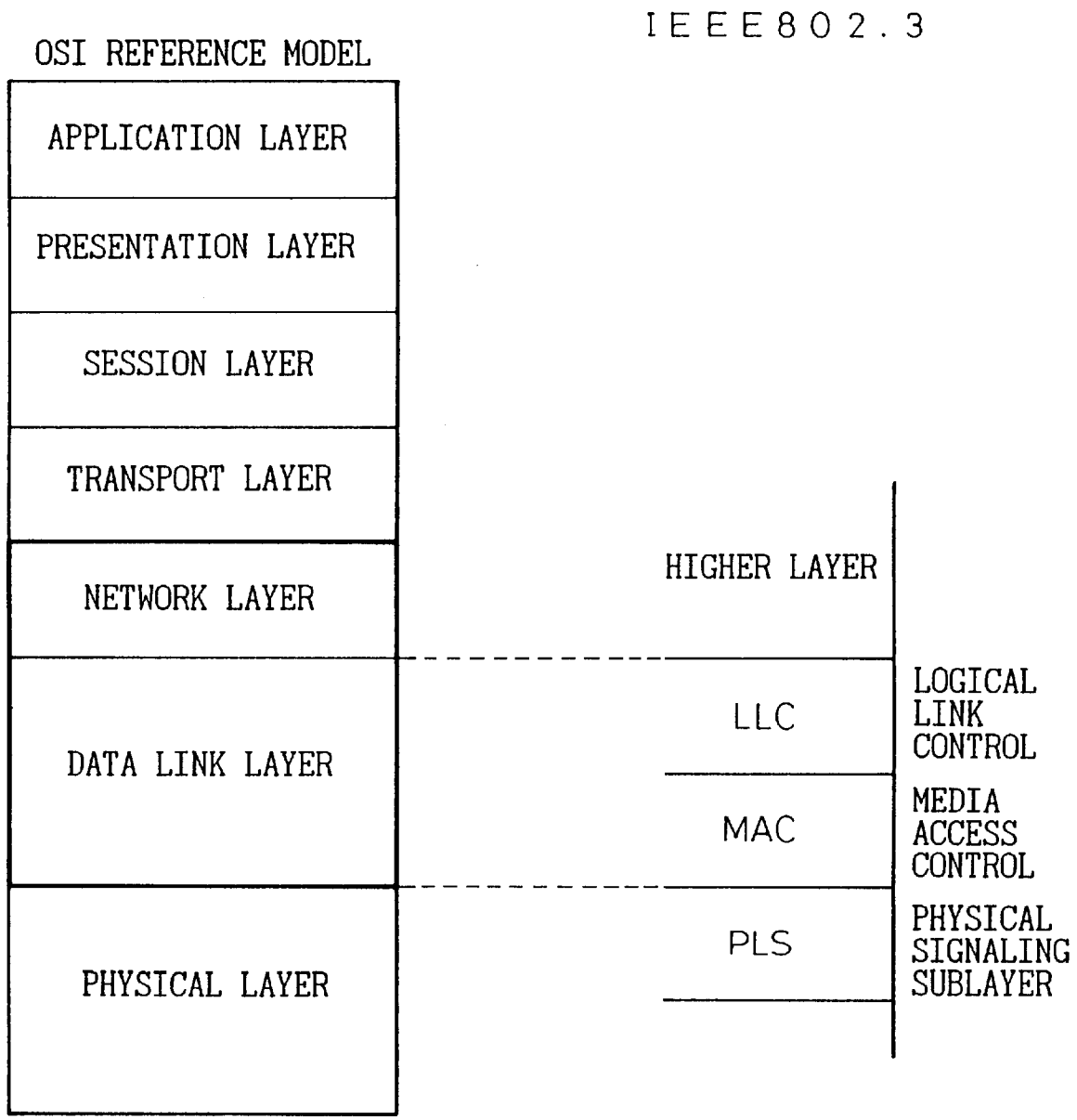
FIG. 1 explains relationships between the layers of an OSI reference model and the layers of IEEE 802.3.
Figure 2:
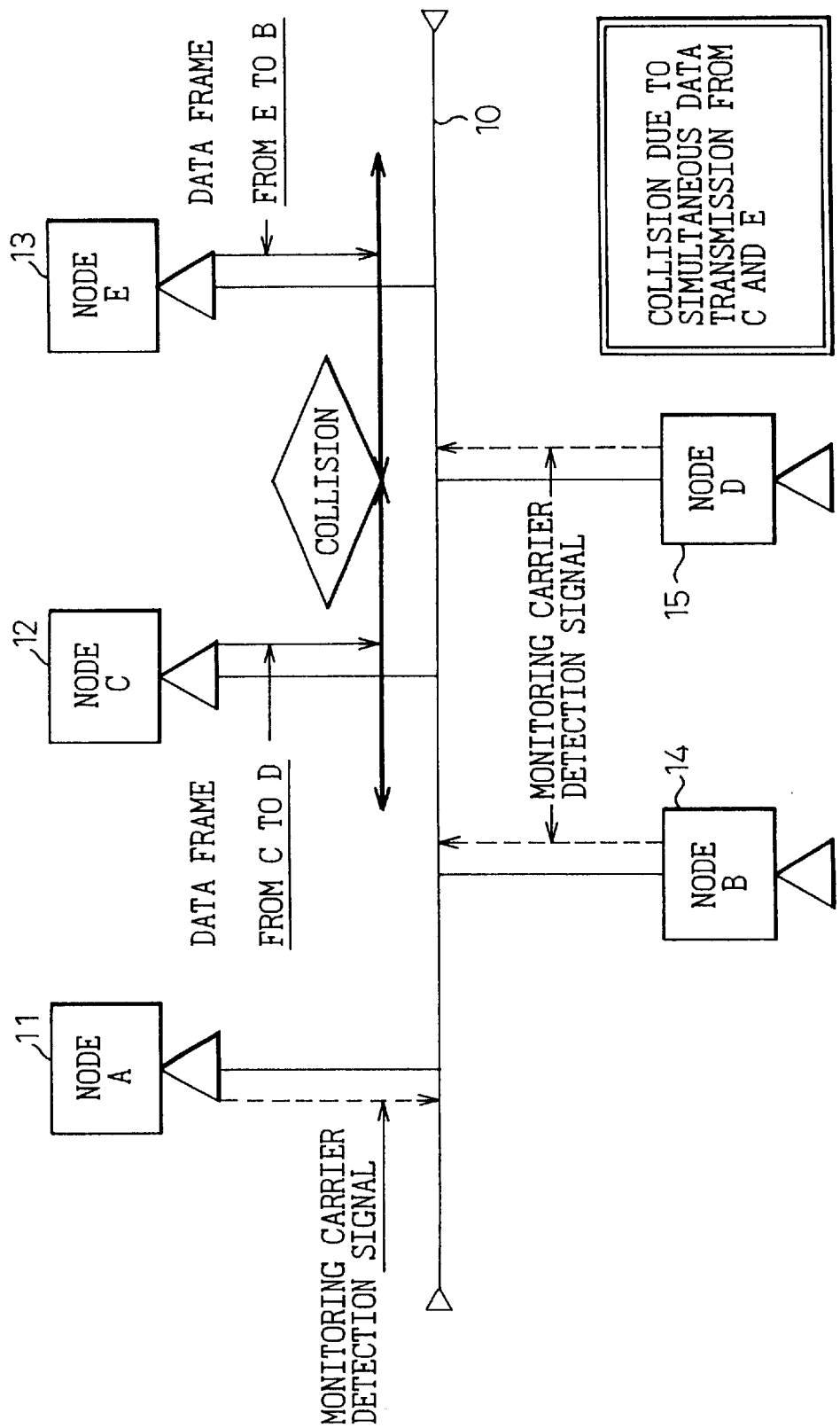
FIGS. 2 and 3 explain the operation of the CSMA/CD system.
Figure 3:
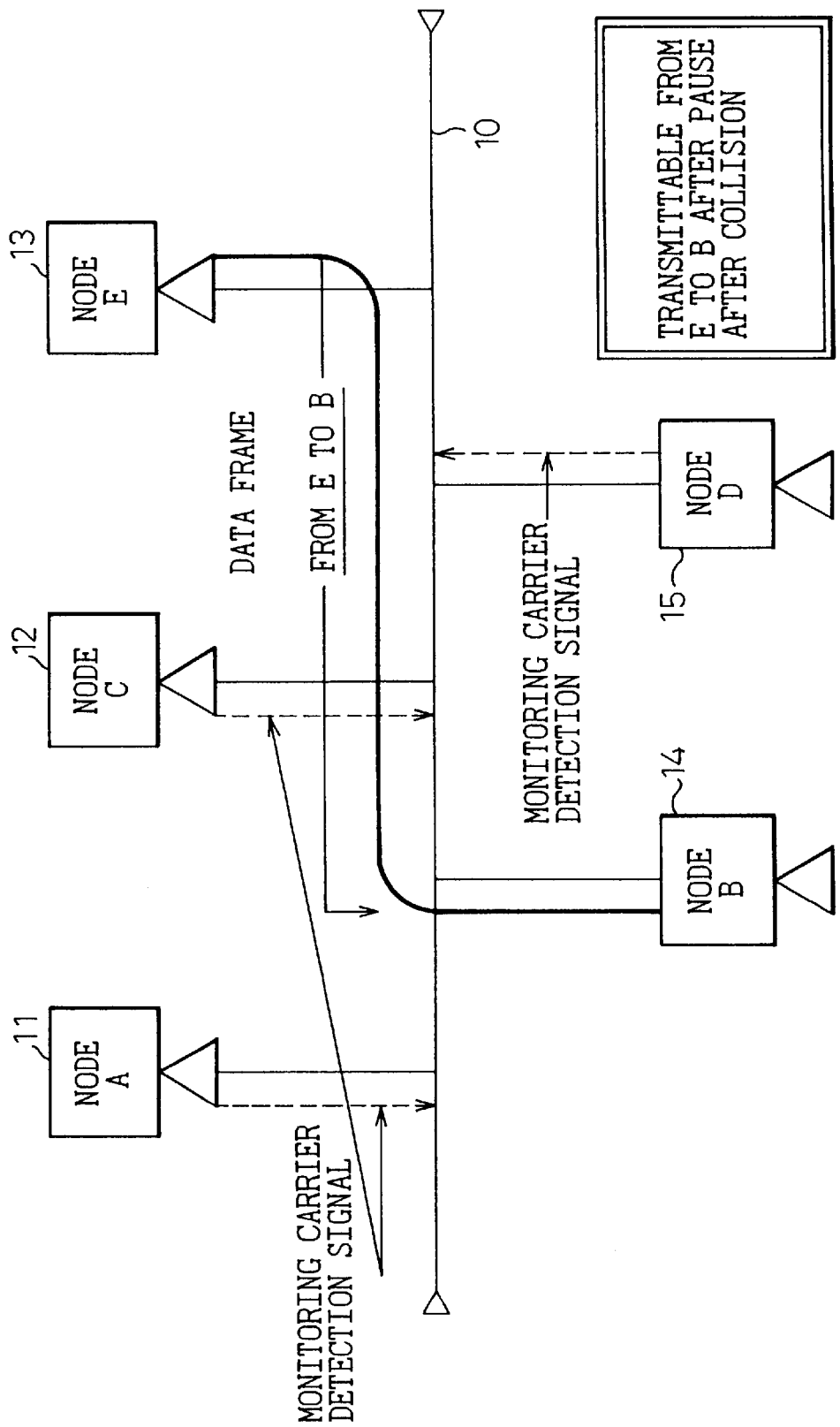
Figure 4:
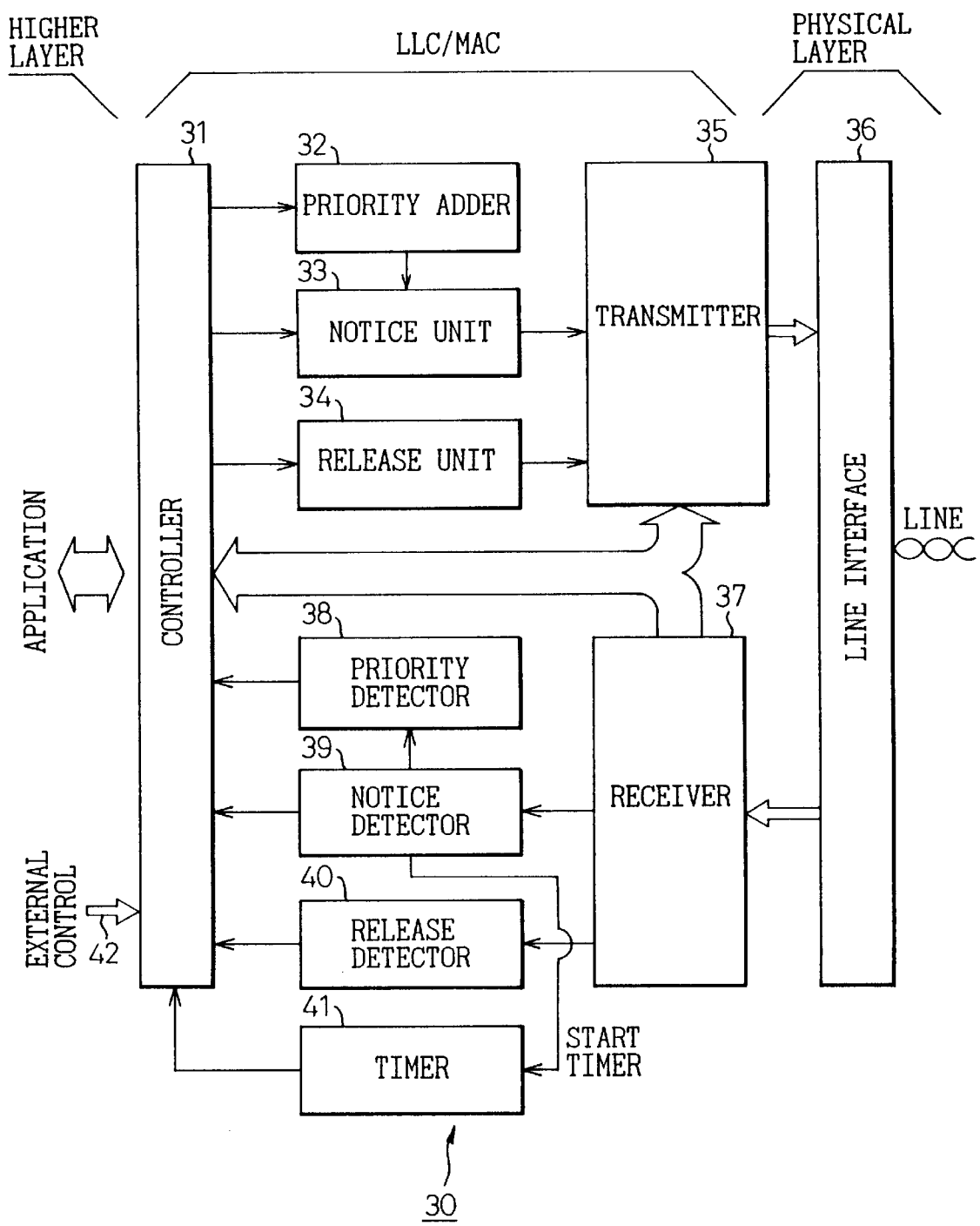
FIG. 4 shows a basic structure of an apparatus for realizing priority data transmission for the CSMA/CD system according to the present invention.

FIG. 4 shows a basic structure of an apparatus for realizing priority data transmission for the CSMA/CD system according to the present invention.

The apparatus of the present invention relates to a structure of the network and data link layers of the OSI reference model, i.e., the LLC and MAC sublayers of IEEE 802.3. A transmission part of the apparatus has a transmitter 35 for transmitting communication control signals and application data from a higher layer to a line, and a notice unit 33 for instructing the transmitter 35 to send a priority transmission notice to the other nodes before transmitting data.

The transmission part also has a release unit 34 for instructing the transmitter 35 to send a release notice to the other nodes, and a priority adder 32 for adding priority to the priority transmission notice.

A reception part of the apparatus has a receiver 37 for receiving data from the line, a notice detector 39 for detecting a priority transmission notice in the received data, and a release detector 40 for detecting a release notice in the received data. The reception part also has a timer 41 for counting a preset time from when the notice detector 39 detects a priority transmission notice. Once the timer 41 counts the preset time, a priority data receiving state is cancelled.

The reception part also has a priority detector 38 for detecting the priority attached to the priority transmission notice. A controller 31 interfaces with an application in a higher layer, controls the transmission and reception parts, and realizes the priority data transmission of the present invention.

Figure 5A:
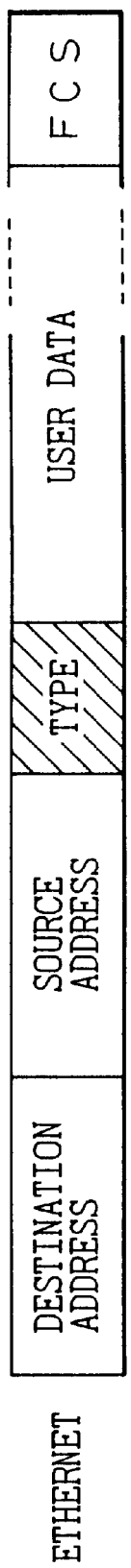
FIGS. 5A and 5B show examples of MAC frame formats for realizing priority data transmission in a data link layer of the OSI reference model according to the present invention.
Figure 5B:
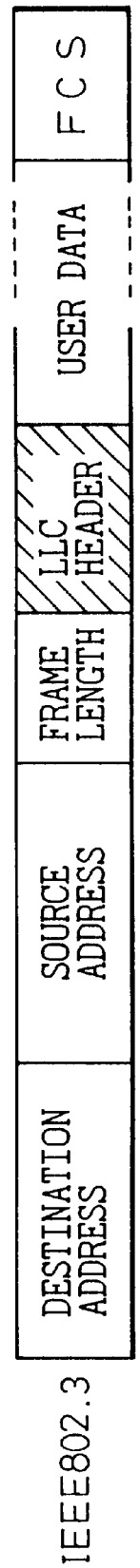

FIGS. 5A and 5B show examples of MAC frame formats used to realize priority data transmission in the data link layer of the OSI reference model.

FIG. 5A uses an MAC frame type field of an Ethernet frame and FIG. 5B an LLC header field of a CSMA/CD standard frame of IEEE 802.3, to carry a priority transmission notice, a release notice, or priority according to the present invention.

The MAC frame type field and LLC header field consist each of two bytes in which a specific value for the priority transmission notice, release notice, or priority is set. A destination address field is entirely filled with 1s to broadcast the frame to all nodes connected to the same segment. A source address field stores the address of a source node that sends the frame.

The MAC frame is assembled and transmitted by the transmitter 35. At this time, the notice unit 33, the release unit 34, and the priority adder 32 set specific values in the MAC frame type field or the LLC header field of the MAC frame, and 1s are set in the destination address field of the MAC frame. A user data field of the MAC frame stores application data provided by the controller 31.

The receiver 37 receives and decomposes a MAC frame. The notice detector 39, release detector 40, and priority detector 38 detect a priority transmission notice, a release notice, or priority in the received MAC frame.

FIGS. 6 and 7 show examples of IP datagram (packet) formats used to realize priority data transmission in the network layer of the OSI reference model.

Option and TOS (type of service) fields of the IP packet format are used to carry a priority transmission notice, a release notice, or priority. In FIG. 6, the option field is used to carry the priority transmission notice or the release notice. In FIG. 7, the TOS field is additionally used to carry priority.

The option and TOS fields of the IP packet of FIG. 7 carry specific values corresponding to the priority transmission notice and priority, or the release notice. When broadcasting the IP packet, an end-point-address field is filled with is so that the packet may be received by the other nodes. A start point address of the packet is used to carry the address of a source node that sends the packet.

The transmitter 35 assembles an IP packet, attaches a broadcasting MAC frame to the IP packet, and transmits the IP packet. At this time, the notice unit 33, release unit 34, and priority adder 32 set specific values in the option and TOS fields of the IP packet, and the end-point-address field of the packet is filled with 1s. Application data from the controller 31 is set in the user data field of the packet.

The receiver 37 receives and decomposes an IP packet, and a priority transmission notice with or without priority, or a release notice is detected in the received packet by the notice detector 39, release detector 40, and priority detector 38.

In this way, the present invention is capable of giving priority to a specific node in a LAN employing the CSMA/CD system.

The priority data transmission of the present invention will be explained with reference to FIGS. 8 to 13.

FIG. 8 explains a basic operation of a method of realizing the priority data transmission of the present invention for use with the CSMA/CD system.

FIG. 9 shows an operation sequence of the method of FIG. 8.

An application at a node "aa" (21) requests the controller 31 to transmit a large amount of data. Before transmitting the data, the controller 31 controls the notice unit 33 to broadcast a priority transmission notice to the other nodes b, c, and d (22 to 24) as indicated with a reference mark ①.

The notice detector 39 of each of the nodes 22 to 24 that are connected to the same segment of a line 20 to which the node 21 is connected detects the priority transmission notice and transfers it to its own controller 31. The controller 31 puts the transmission part of its own node in a transmission disabled state as indicated with a reference mark ②. The transmission disabled nodes 22 to 24 wait for a release notice as indicated with a reference mark ③.

The node 21 that has transmitted the priority transmission notice exclusively uses the line 20 and transmits a large amount of data to the node 24 serving as a destination node as indicated with a reference mark ④. Upon completion of the data transmission, the controller 31 of the node 21 controls the release unit 34 to broadcast a release notice to the nodes 22 to 24 as indicated with a reference mark ⑤.

The release detector 40 of each of the nodes 22 to 24 detects the release notice and transfers it to its own controller 31. The controller 31 restores the transmission part to a transmission enabled state from the transmission disabled state as indicated with a reference mark ⑥.

FIG. 10 shows a modification of the sequence of FIG. 9.

The node 21 serving as a source node broadcasts a priority transmission notice as indicated with a reference mark ① and transmits data as indicated with a reference mark ③. After the completion of the data transmission, the node 21 transmits no release notice. Instead, the timer 41 of each of the nodes 22 to 24 starts to count a preset time in response to the priority transmission notice from the node 21. When the timer 41 counts the preset period, the controller 31 of each of the nodes 22 to 24 restores the transmission part of its own node to a transmission enabled state as indicated with a reference mark ⑦ from a transmission disabled state indicated with a reference mark ②.

FIGS. 11 and 12 show operation sequences involving priority determination.

In FIG. 11, the node 21 has priority P2. When broadcasting a priority transmission notice, the priority adder 32 of the node 21 attaches the priority P2 to the priority transmission notice. The node 22 has priority P1. In this example, a smaller priority value indicates higher transmission priority. Namely, the node 22 with the priority P1 has higher transmission priority than the node 21 with the priority P2.

The node 22 receives the priority transmission notice from the node 21, and the priority detector 38 of the node 22 detects the priority P2 of the node 21 in the received notice and informs the controller 31 of the same. The controller 31 compares the received priority P2 with its own priority P1 stored in the priority adder 32. Since the priority P1 is higher than the priority P2, the controller 32 of the node 22 keeps the transmission part thereof enabled as indicated with a reference mark ⑧. The controller 31 of the node 22 discards a release notice transmitted from the node 21 as indicated with a reference mark ⑨.

In FIG. 12, the node 21 broadcasts a priority transmission notice with the priority P2. The node 24 has priority P4, which is lower than the priority P2 of the node 21. The priority detector 38 of the node 24 detects the priority P2 in the priority transmission notice and transfers it to the controller 31. The controller 31 compares the priority P2 with the priority P4 of its own. Since the priority P4 is lower than the priority P2, the controller 31 disables the transmission part of the node 24 as indicated with a reference mark ②. The node 21 sends data and then a release notice. In response to the release notice, the controller 31 of the node 24 enables the transmission part of the node 24 as indicated with a reference mark ⑤.

Figure 13:
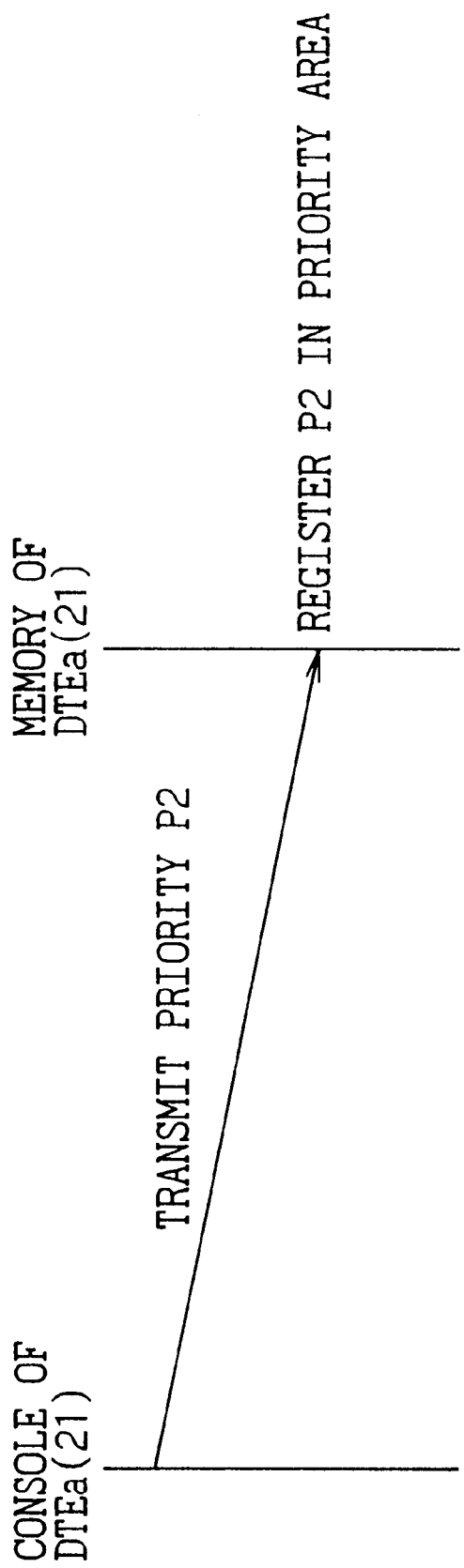
FIG. 13 shows a sequence of registering, changing, or deleting a priority.

FIG. 13 shows an operation sequence of registering, changing, or deleting priority.

The node 21, for example, has a console for registering, changing, or deleting the priority P2 through an external control port 42 (FIG. 4). The priority P2 is stored in a memory that may be installed in the controller 31 or the priority adder 32. The stored priority P2 is used as explained with reference to FIGS. 11 and 12.

FIGS. 14 to 20 are flowcharts showing the details of the sequences of FIGS. 8 to 13.

Figure 14:
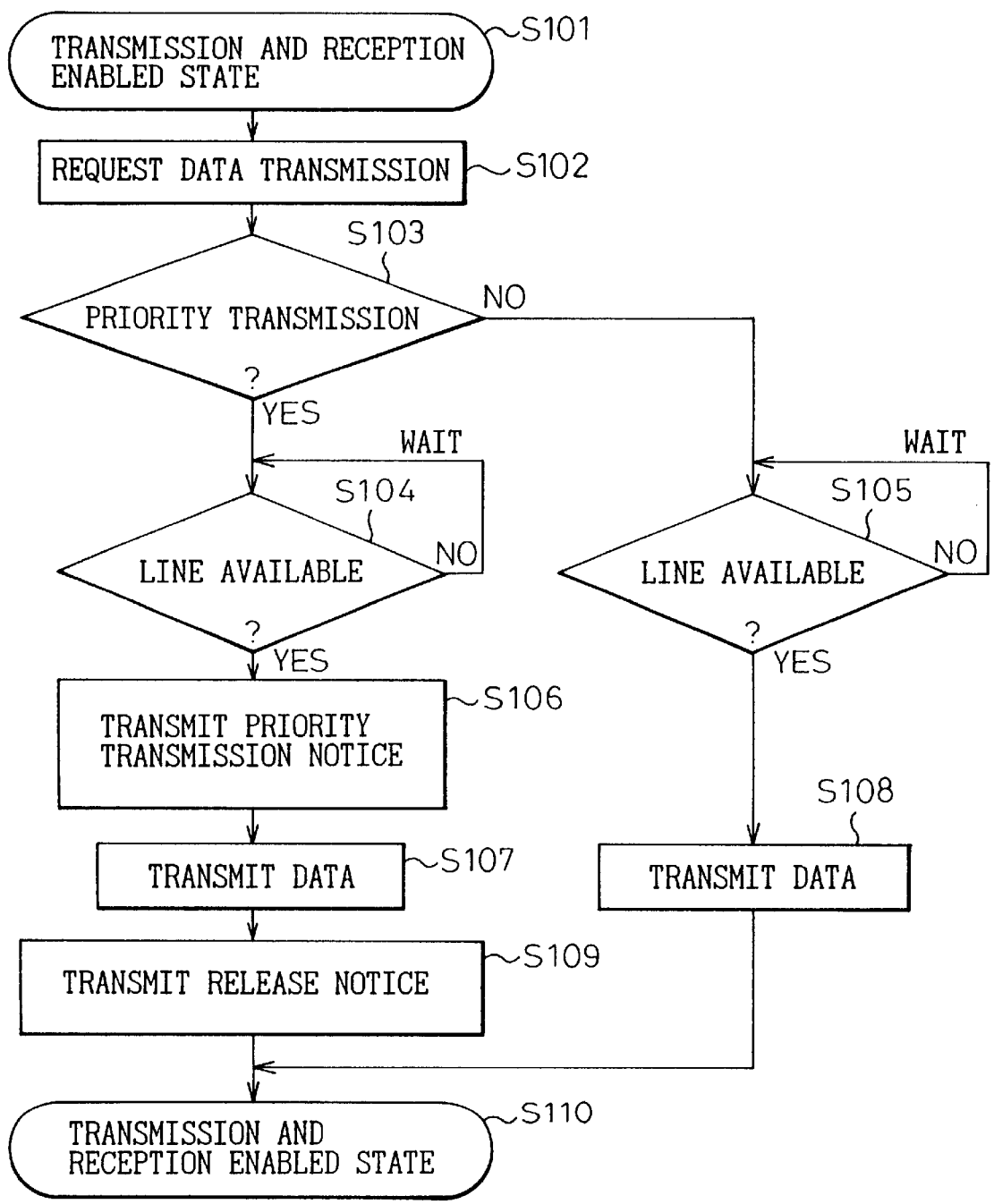
FIGS. 14 and 15 are flowcharts corresponding to the operation sequence of FIG. 9.
Figure 15:
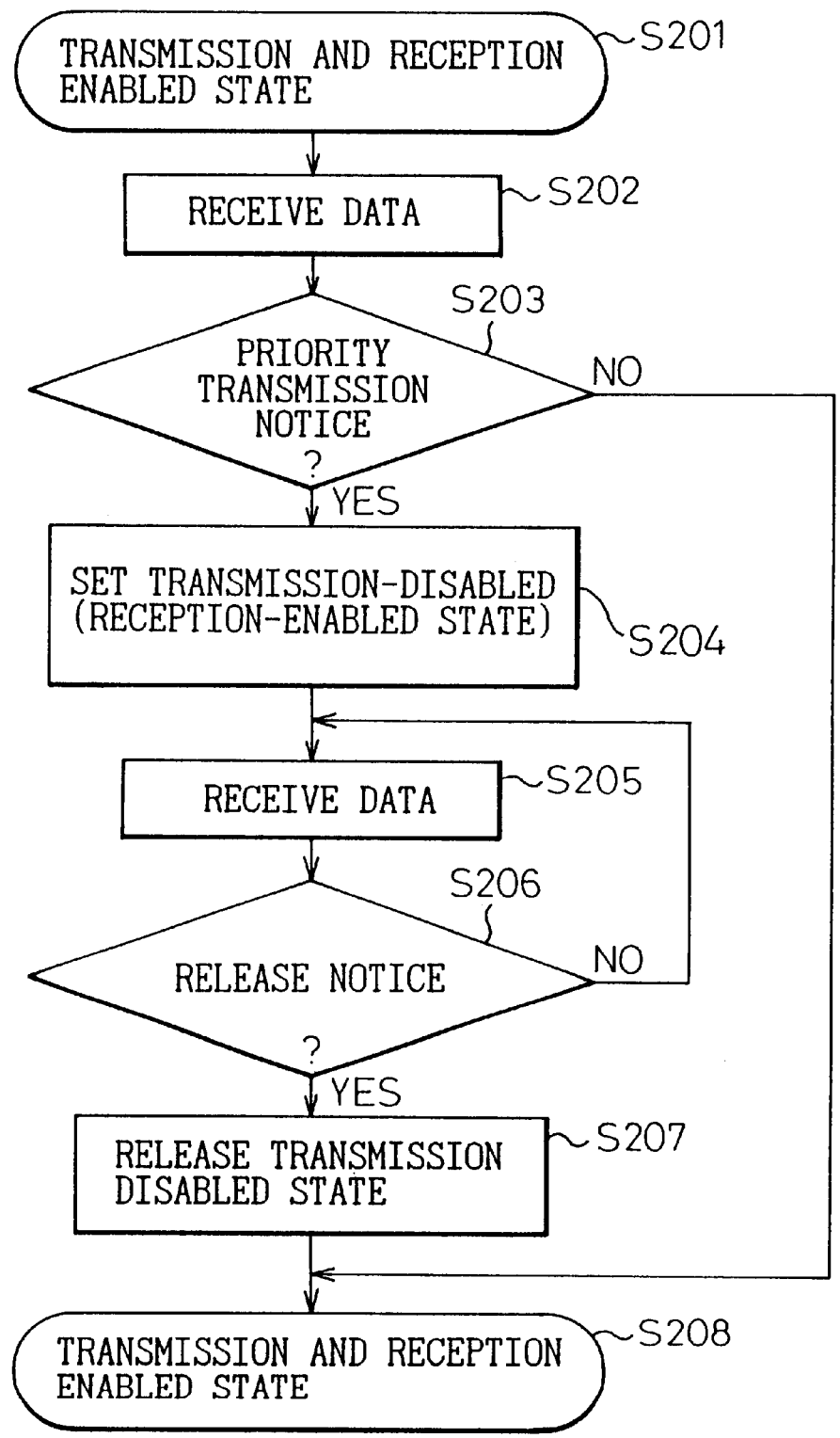

The flowcharts of FIGS. 14 and 15 show the details of the operation sequence of FIG. 9.

The operation of the source node DTEa (21) of FIG. 9 that transmits a priority transmission notice will be explained with reference to FIG. 14.

In step S101, the source node 21 is in a transmission-reception-enabled state. In step S102, the node 21 receives a data transmission request from an application. In step S103, the node 21 determines whether or not the data must be transmitted with priority according to the quantity and attributes such as priority, urgency, and real-time requirement of the data to be transmitted.

If the data must be transmitted with priority, step S104 checks to see if the transmission line 20 is available. If the transmission line 20 is available, step S106 broadcasts a priority transmission notice to put the other nodes 22 to 24 in a transmission disabled state so that the node 21 can exclusively use the transmission line 20 without forcibly cutting communication between the other nodes.

In step S107, the node 21 continuously transmits the data from the application to the destination node 24. As soon as the data transmission is completed, the node 21 transmits a release notice in step S109. In step S110, the nodes 22 to 24 enable their transmission parts. If step S103 determines that the data must be transmitted as usual, the node 21 checks to see if the line 20 is available in step S105, and if it is available, transmits the data as usual in step S108.

The operation of the nodes DTEb to DTEd (22 to 24) that receive the priority transmission notice from the node 21 will be explained with reference to FIG. 15.

In step S201, the nodes 22 to 24 are in a transmission-reception-enabled state. Step S202 receives data, and step S203 determines whether or not the received data is the priority transmission notice.

If the received data is the priority transmission notice, step S204 disables the transmission parts of the nodes 22 to 24. Under this state, step S205 receives data, and step S206 checks to see if the received data is a release notice. If it is the release notice, step S207 enables the transmission parts of the nodes 22 to 24. In step S208, the nodes 22 to 24 are each in the data transmission-reception-enabled state. If the received data is ordinary data other than the priority transmission notice in step S203, the nodes 22 to 24 maintains the transmission-reception-enabled state in step S208.

Figure 16:
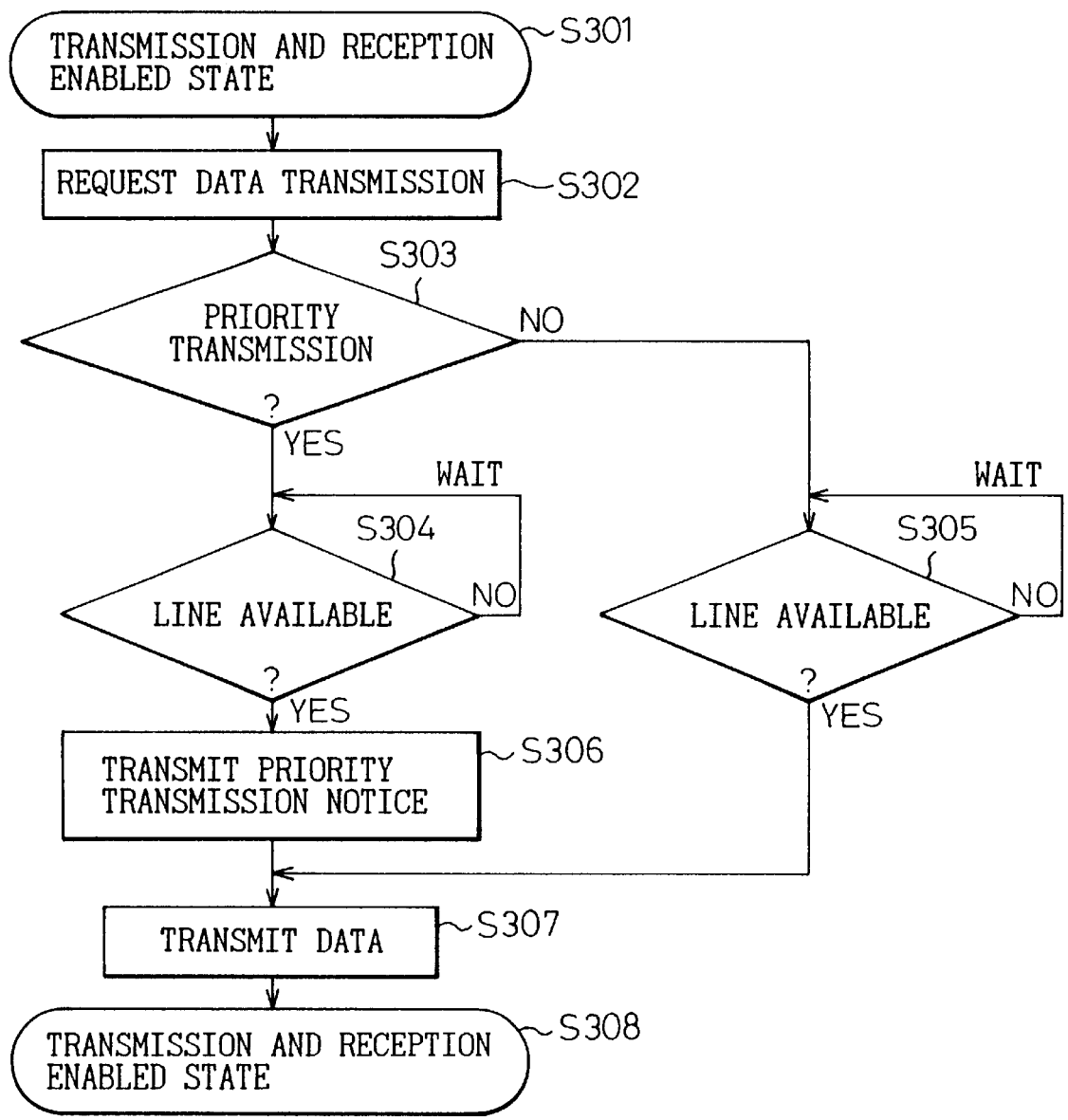
FIGS. 16 and 17 are flowcharts corresponding to the operation sequence of FIG. 10.
Figure 17:
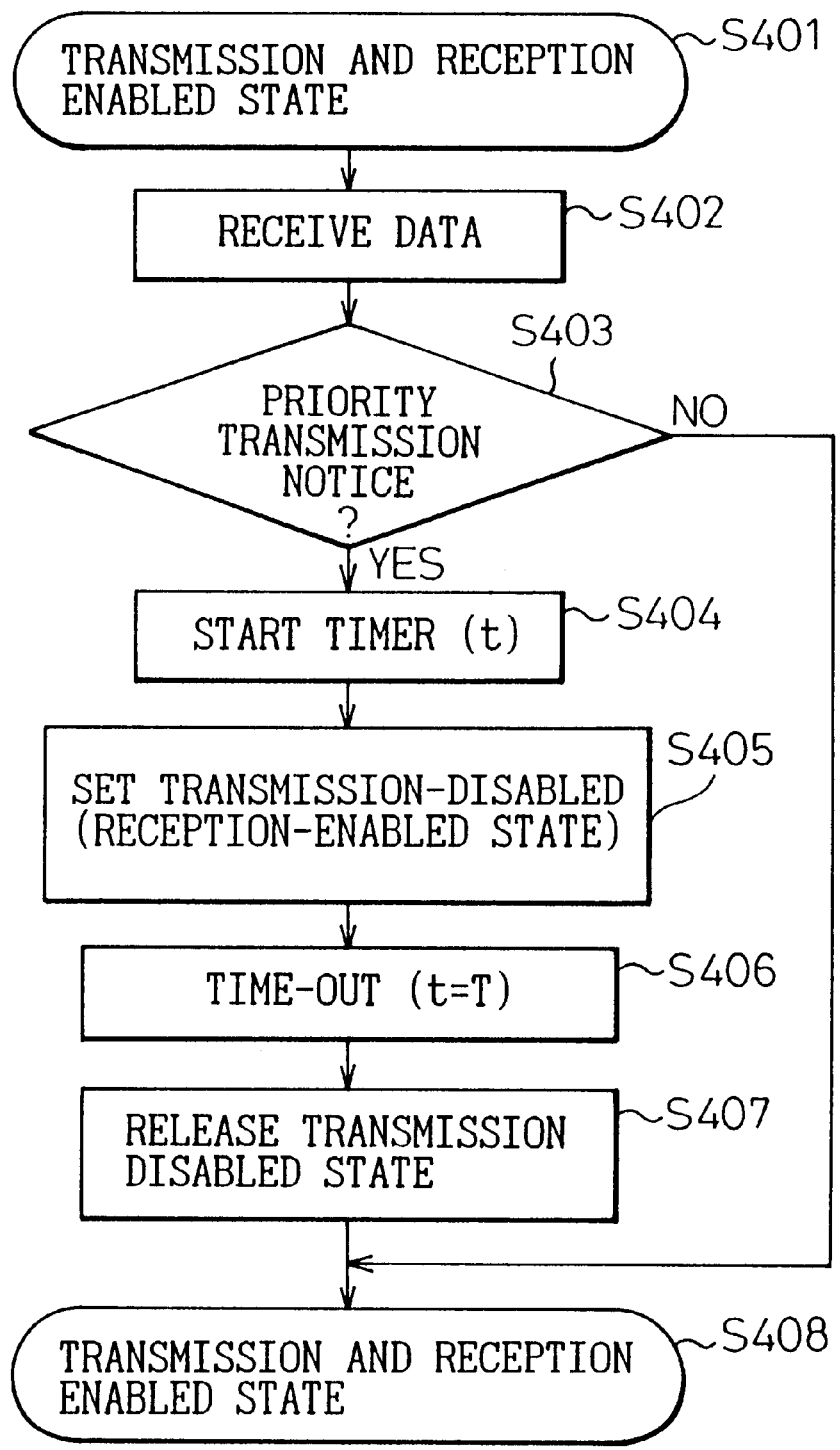

FIGS. 16 and 17 are flowcharts showing the details of the operation sequence of FIG. 10.

The operation of the node DTEa (21) of FIG. 10 serving as a source node that transmits a priority transmission notice will be explained with reference to FIG. 16.

FIG. 16 differs from FIG. 14 in that FIG. 16 has no step corresponding to step S109 of FIG. 14 for transmitting a release notice.

The operation of the nodes DTEb to DTEd (22 to 24) of FIG. 10 that receive the priority transmission notice from the node 21 will be explained with reference to FIG. 17.

Upon receiving the priority transmission notice, the nodes 22 to 24 start each the timer 41 in step S404 to count a preset data transmission time. This preset time is a back-off time multiplied by $10^4$.

During the preset time, step S405 disables the transmission parts of the nodes 22 to 24. Namely, only the reception parts of the nodes 22 to 24 are enabled. When the timer counts the preset time in step S406, step S407 enables the transmission parts of the nodes 22 to 24. In step S408, the nodes 22 to 24 are in the transmission-reception-enabled state. If the received data is ordinary data other than the priority transmission notice in step S403, the nodes 22 to 24 maintain the transmission-reception-enabled state in step S408.

Figure 18:
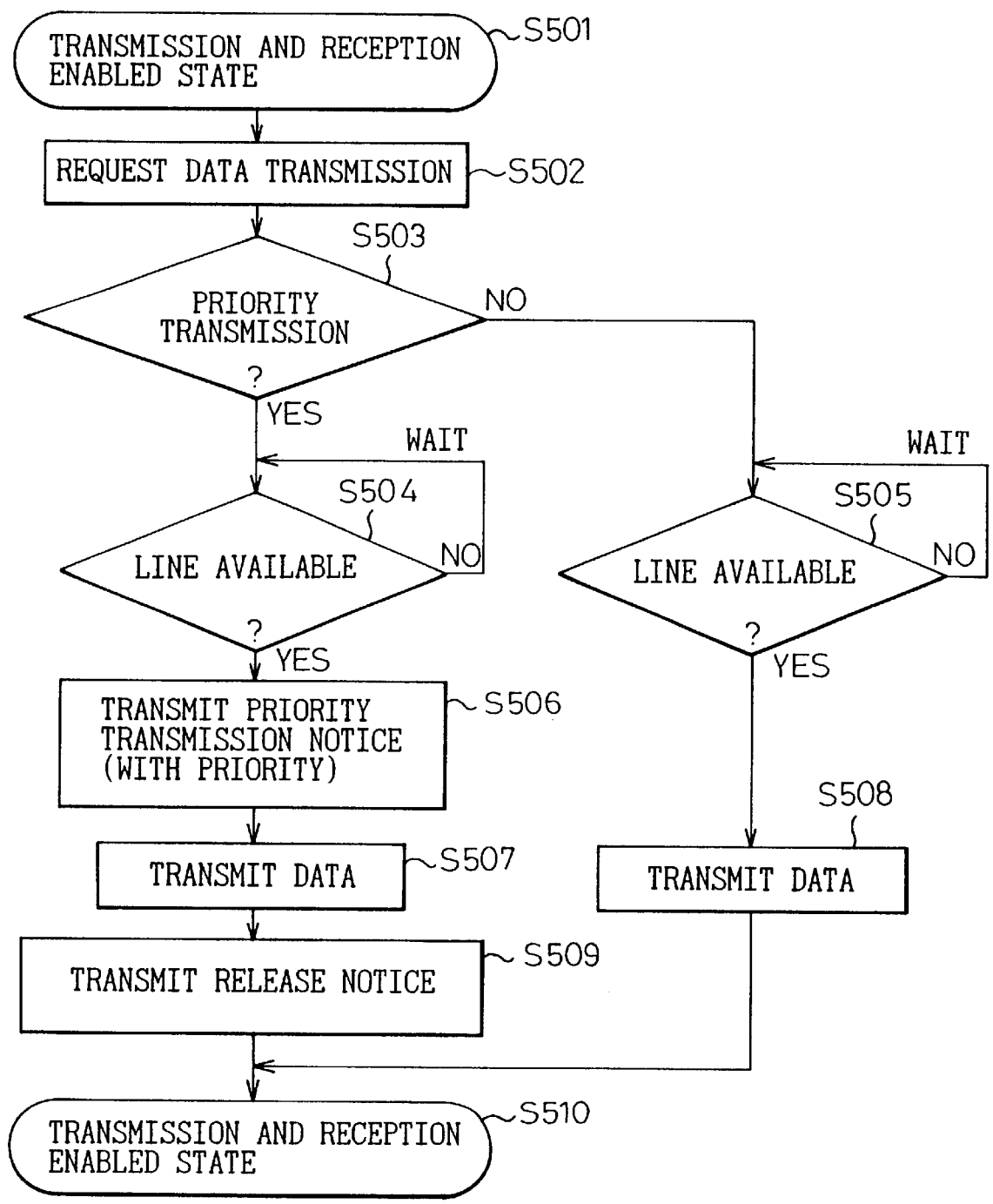
FIGS. 18 and 19 are flowcharts corresponding to the operation sequences of FIGS. 11 and 12.
Figure 19:
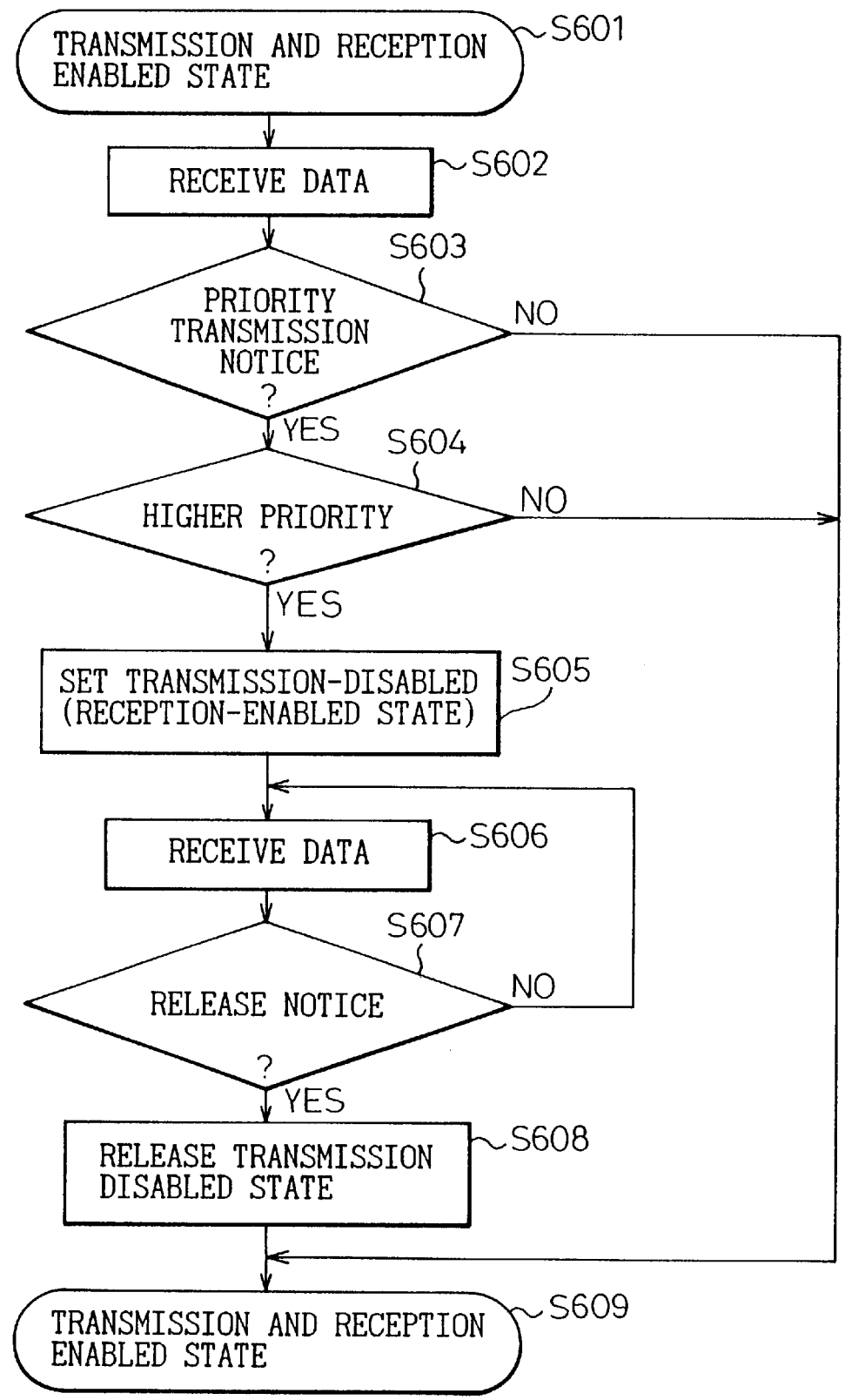

FIGS. 18 and 19 are flowcharts showing the details of the operation sequences of FIGS. 11 and 12.

The operation of the node DTEa (21) serving as a source node in FIGS. 11 and 12 to transmit a priority transmission notice will be explained with reference to FIG. 18.

FIG. 18 differs from FIG. 14 in that step S506 of FIG. 18 transmits the priority transmission notice with priority.

The operation of the nodes DTEb to DTEd (22 to 24) of FIGS. 11 and 12 to receive the priority transmission notice with priority from the node 21 will be explained with reference to FIG. 19.

If step S603 confirms the reception of the priority transmission notice, step S603 compares the priority P2 of the source node 21 with the priority (P1 in FIG. 11 and P4 in FIG. 12) of each of the nodes 22 to 24.

If the received priority is higher than the priority of the recipient node, step S605 puts the recipient node in a transmission disabled state, to let the source node 21 use the line 20. The steps that follow are the same as those that follow step S204 of FIG. 15. If the received priority is lower than that of the recipient node in step S604, step S609 maintains the transmission-reception-enabled state of the recipient node irrespective of the reception of the priority transmission notice.

Figure 20:
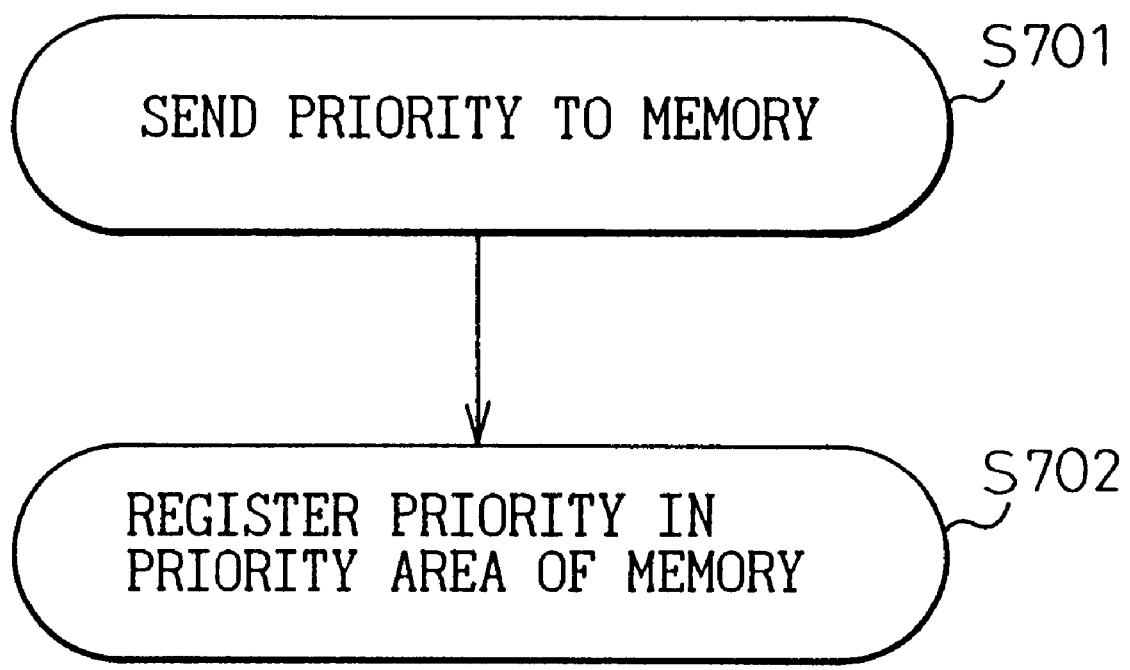
FIG. 20 is a flowchart corresponding to the operation sequence of FIG. 13.

FIG. 20 is a flowchart showing the details of the operation sequence of FIG. 13.

Although FIGS. 13 and 20 show only a priority registering process carried out in steps S701 and S702, the principle of the process is applicable to priority changing and deleting processes.

As explained above, the CSMA/CD system gives the same data transmission priority to all nodes that are connected to the same segment of a transmission line and forcibly transmits data with priority by using the collision detection and data resending functions in the physical layer of the OSI reference model.

On the other hand, the present invention transmits a frame or packet containing a priority transmission notice in advance in the data link or network layer of the OSI reference model that is higher than the physical layer thereof. As a result, a node that has a large amount of data to transmit with priority can temporarily exclusively use a network to transmit the data in a short time without forcibly cutting communication between the other nodes. The present invention realizes priority data transmission for the CSMA/CD system and eliminates the prior art's resending operations triggered by data collisions, to thereby improve the efficiency of use of LANs.

What is claimed is:

1. A method of realizing priority data transmission for a CSMA/CD system, comprising the steps of:

checking to see if a transmission line has a free space in response to a data transmission request from a node serving as a source node;

transmitting, if the transmission line has a free space, a priority transmission notice carried by a data-link-layer protocol signal of the CSMA/CD system from the source node directly to the other nodes;

putting the nodes except the source node in a transmission-disabled, reception-enabled state when the priority transmission notice is received by the nodes; and transmitting data for which the data transmission request has been made from the source node to a node serving as a destination node, the method being performed without the use of an arbitration device external to the source node and the other nodes, wherein:

the data-link-layer protocol signal of the CSMA/CD system is a MAC frame signal; and the MAC frame signal has a frame type field or an LLC header field, either of the fields being used to carry at least one of: (1) the priority transmission notice, (2) a priority assigned to the source node, and (3) a release notice releasing the nodes from the transmission-disabled, reception-enabled state when the transmission of data, for which the data transmission request has been made, has been completed.

2. The method of claim 1, further comprising the steps of:

attaching priority assigned to the source node to the priority transmission notice and transmitting the priority transmission notice from the source node to the other nodes; and comparing, at each recipient node, the priority assigned to the source node with priority assigned to the recipient node, and if the priority assigned to the source node is higher than that assigned to the recipient node, putting the recipient node in the transmission-disabled, reception-enabled state.

3. The method of claim 1, further comprising the steps of:

transmitting a release notice carried by a data-link-layer protocol signal of the CSMA/CD system from the source node to the other nodes; and restoring the nodes to a transmission-reception-enabled state when the release notice is received by the nodes.

4. The method of claim 1, further comprising the step of:
restoring the nodes to a transmission-reception-enabled state after a predetermined time elapses from when the priority transmission notice is received by the nodes.

5. A method of realizing priority data transmission for a CSMA/CD system, comprising the steps of:
checking to see if a transmission line has a free space in response to a data transmission request from a node serving as a source node;
transmitting, if the transmission line has a free space, a priority transmission notice carried by a data-link-layer protocol signal of the CSMA/CD system from the source node to the other nodes;
transmitting data for which the data transmission request has been made from the source node to a node serving as a destination node; and
putting the nodes except the source node in a transmission-disabled, reception-enabled state when the priority transmission notice is received by the nodes, wherein:
the data-link-layer protocol signal of the CSMA/CD system is replaced with a network-layer protocol signal of an OSI reference model;
the network-layer protocol signal is an IP datagram signal having an option field and a TOS field;
the option field is used to carry one of the priority transmission notice and the release notice; and
the TOS field is used to carry the priority assigned to the source node.

6. An apparatus for realizing priority data transmission for a CSMA/CD system, comprising:
transmitting means for transmitting data to a line;
noticing means for instructing the transmitting means to transmit a priority transmission notice from a source node and carried by a data-link-layer protocol signal of the CSMA/CD system to the other nodes;
receiving means for receiving data from the line;
notice detecting means for detecting a priority transmission notice in the data received by the receiving means; and
controlling means for instructing the noticing means to transmit the priority transmission notice in response to a data transmission request from an application, making the transmitting means transmit data for which the data transmission request has been made, and disabling the transmitting means if the notice detecting means detects a priority transmission notice,
the apparatus not including an arbitration device external to the source node and the other nodes, further comprising:
priority adding means for adding given priority to the priority transmission notice to be transmitted from the transmitting means; and
priority detecting means for detecting priority in a priority transmission notice detected by the notice detecting means,
the controlling means comparing the priority detected by the priority detecting means with priority of its own node, and if the detected priority is higher than that of its own node, disabling the transmitting means.

7. The apparatus of claim 6, further comprising:
timer means for counting a predetermined period after the notice detecting means detects a priority transmission notice,
the controlling means enabling the transmitting means when the timer means counts the predetermined period.

8. The apparatus of claim 6, further comprising:
releasing means for instructing the transmitting means to transmit a release notice carried by a data-link-layer protocol signal of the CSMA/CD system to the other nodes; and
release notice detecting means for detecting a release notice in the data received by the receiving means,
the controlling means enabling the transmitting means if the release notice detecting means detects the release notice.

9. An apparatus for realizing priority data transmission for a CSMA/CD system, comprising:
transmitting means for transmitting data to a line;
noticing means for instructing the transmitting means to transmit a priority transmission notice from a source node and carried by a data-link-layer protocol signal of the CSMA/CD system to the other nodes;
receiving means for receiving data from the line;
notice detecting means for detecting a priority transmission notice in the data received by the receiving means; and
controlling means for disabling the transmitting means if the notice detecting means detects a priority transmission notice, wherein:
the data-link-layer protocol signal of the CSMA/CD system is a MAC frame signal; and
the MAC frame signal has a frame type field or an LLC header field, either of the fields being used to carry at least one of: (1) the priority transmission notice, (2) a priority assigned to the source node, and (3) a release notice for enabling the transmitting means when the transmission of data, for which the priority transmission notice was transmitted, has been completed.

10. The apparatus of claim 9, further comprising:
priority adding means for adding given priority to the priority transmission notice to be transmitted from the transmission means; and
priority detecting means for detecting in the priority transmission notice detected by the notice detecting means,
the controlling means comparing the priority detected by the priority detecting means with priority of its own node, and if the detected priority is higher than that of its own node, disabling the transmitting means.

11. An apparatus for realizing priority data transmission for a CSMA/CD system, comprising:
transmitting means for transmitting data to a line;
noticing means for instructing the transmitting means to transmit a priority transmission notice from a source node and carried by a data-link-layer protocol signal of the CSMA/CD system to the other nodes;
receiving means for receiving data from the line;
notice detecting means for detecting a priority transmission notice in the data received by the receiving means; and
controlling means for instructing the noticing means to transmit the priority transmission notice in response to a data transmission request from an application, making the transmitting means transmit data for which the data transmission request has been made, and disabling the transmitting means if the notice detecting means detects a priority transmission notice, and further comprising:

priority adding means for adding given priority to the priority transmission notice to be transmitted from the transmitting means; and priority detecting means for detecting priority in a priority transmission notice detected by the notice detecting means, the controlling means comparing the priority detected by the priority detecting means with priority of its own node, and if the detected priority is higher than that of its own node, disabling the transmitting means, wherein:

the data-link-layer protocol signal of the CSMA/CD system is replaced with a network-layer protocol signal of an OSI reference model;

the network-layer protocol signal is an IP datagram signal having an option field and a TOS field;

the option field is used to carry one of the priority transmission notice and the release notice; and the TOS field is used to carry the priority.

* * * * *